United States Patent [19]

McMurtry

[11] Patent Number: 4,651,405
[45] Date of Patent: Mar. 24, 1987

[54] TOOL CHANGE APPARATUS
[75] Inventor: David R. McMurtry, Wotton-Under-Edge, United Kingdom
[73] Assignee: Renishaw plc, Wotton-Under-Edge, England
[21] Appl. No.: 756,995
[22] PCT Filed: Nov. 14, 1984
[86] PCT No.: PCT/GB84/00393
    § 371 Date: Jul. 12, 1985
    § 102(e) Date: Jul. 12, 1985
[87] PCT Pub. No.: WO85/02138
    PCT Pub. Date: May 23, 1985
[30] Foreign Application Priority Data
    Nov. 15, 1983 [GB] United Kingdom ............... 8330412
[51] Int. Cl.⁴ ............................................. B23Q 3/55
[52] U.S. Cl. ................................. 29/568; 408/239 R; 409/233
[58] Field of Search ................. 29/568; 409/232, 233; 408/239 R

[56] References Cited
U.S. PATENT DOCUMENTS 3,064,321 11/1962 Rose ..................................... 20/92.4
4,332,495  6/1982 Bürgers .................................. 403/6
4,349,946  9/1982 McMurtry ........................ 29/568 X
4,403,391  9/1983 Peacock ................................ 29/568

FOREIGN PATENT DOCUMENTS 0123220 10/1984 European Pat. Off. .
5639845  8/1979 Japan .
 562657  6/1975 Switzerland .
2040742  9/1980 United Kingdom ............... 409/233
2047133 11/1980 United Kingdom .
2094191  9/1982 United Kingdom .

Primary Examiner—John Sipos
Attorney, Agent, or Firm—Spencer & Frank

[57] ABSTRACT

A tool (12) is releasably supported on a head (10) by a kinematic support (35) having elements (36,37) provided respectively on the head (10) and the tool (12) and extending in a plane (A—A) transverse to an axis (10A) of the head (10) by a releasable coupling (17) which comprises a first element (21) provided on the head (10) and engaged with a second element (26) provided on the tool. To release the tool (12) from the head (10) the latter is moved to position the tool (12) at a magazine (16) and by such movement to connect the second element (26) with an operating member (41) provided on the magazine (16). Rotation of the second element (26) by the operating member (41) releases the second element (26) from the first element (21) and frees the head (10) for withdrawal in the direction of its axis (10A). To connect the tool (12) to the head (10) the latter is moved in the direction of its axis (10A) to bring the elements (36,37) of the kinematic support (35) into proximity and to bring the coupling elements (21,26) into proximity. The operating member (41) is then rotated to connect the coupling elements (21,26) and establish engagement of the kinematic support (35). Thereafter the head (10) can be moved to remove the tool (12) from the magazine (16).

8 Claims, 5 Drawing Figures

TOOL CHANGE APPARATUS

This invention relates to tool change apparatus for use in, for example, changing the measuring tools in coordinate measuring machines or changing cutting tools in machine tools.

BACKGROUND OF THE INVENTION

British Pat. No. 2,047,133 shows a tool change apparatus comprising a tool, a storage device having means for releasably supporting the tool in a stored position, a head which is capable of movement relative to the storage device for removal of the tool from the stored position and return of the tool thereto, the head having an axis and including first support surfaces arranged at a plane transverse to said axis, the tool having second support surfaces engageable with the first support surfaces, the first and second support surfaces being adapted to define a kinematic support, and operating means for engaging the tool with the head at said support surfaces and disengaging the tool therefrom. In the known apparatus the engagement and disengagement between the head and the tool is effected by a bayonet system involving relative rotation between the head and the tool about said axis. This leads to difficulty for example in cases where electrical contacts need to be provided between the head and the tool because such contacts would confront each other in the direction of said axis so that said rotation could be undesirable.

SUMMARY OF THE INVENTION

To overcome this difficulty the present invention is characterised by a first coupling element provided on the head, a second coupling element provided on the tool, one of the coupling elements being supported on one of the tool and the head for movement between positions of engagement with or disengagement from the other coupling element thereby to respectively secure the tool to the head and release it therefrom, the one coupling element being arranged, during said movement thereof in the sense of securing the tool to the head, to exert on the tool a force in the direction of said axis thereby to establish engagement between said first and second support surfaces, and in that said operating means is provided on one of the head and the storage device for operating said one of the coupling elements to effect said engagement and disengagement.

DESCRIPTION OF THE PREFERRED EMBODIMENTS

Figure 1:
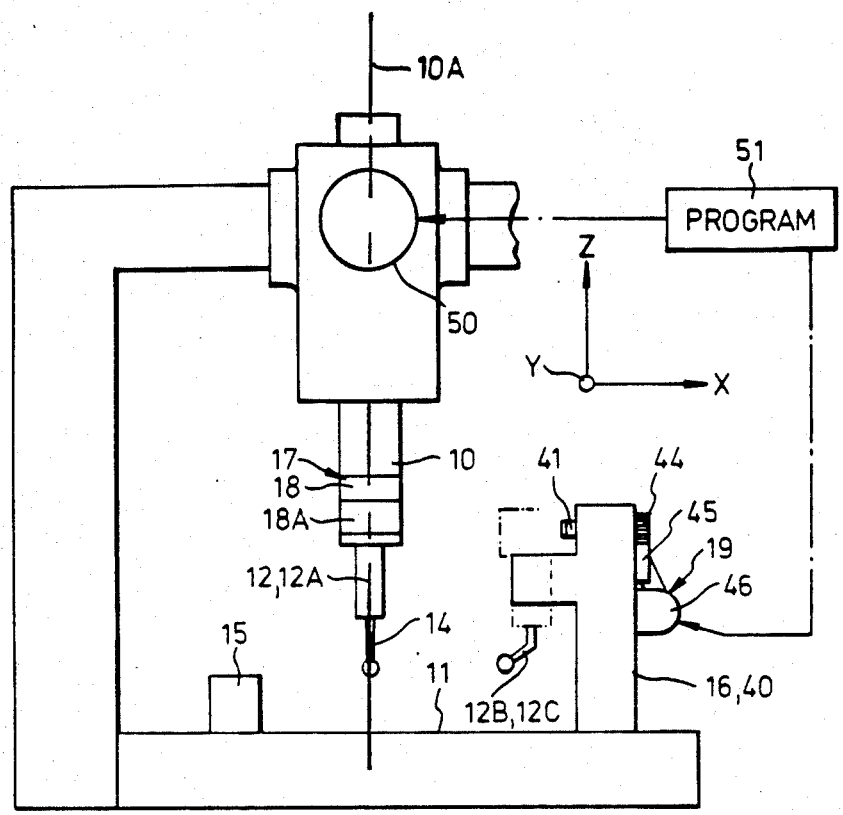
FIG. 1 is an elevation of part of a coordinate measuring machine.
Figure 2:
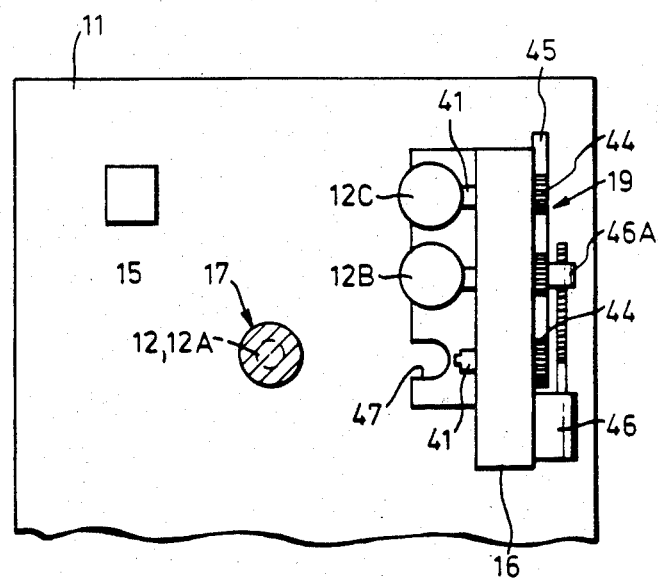
FIG. 2 is a plan view of FIG. 1.

Referring to FIGS. 1, 2 the coordinate measuring machine has a head 10 supported for movement in mutually perpendicular directions X, Y, Z relative to a table 11 defining a fixed structure. The head 10 has a longitudinal axis 10A extending in the Z direction. The head 10 supports a tool or probe 12A having a housing 13 (see FIG. 13) from which projects a stylus 14 whereby to engage a workpiece 15 for the purpose of measuring the workpiece, and the probe 12A is adapted to generate an electrical signal responsive to such engagement. Such signal generation is known per se e.g. from British Pat. No. 1,445,977. The probe 12A is automatically interchangable with other probes 12B,12C supported by a storage device or magazine 16 secured to the table 11. The different probes 12 have different construction or different styli as may be required for measuring different portions of the workpiece, or the magazine may contain such accessories as extension bars by which different probe assemblies may be built up.

The probes 12 are releasably secured to the head 10 by a coupling 17 comprising a first coupling part 18 secured to the head 10 and, in respect of each probe 12, a second coupling part 18A engageable with and releasable from the first part 18 by a mechanism 19 provided on the magazine 16.

Figure 3:
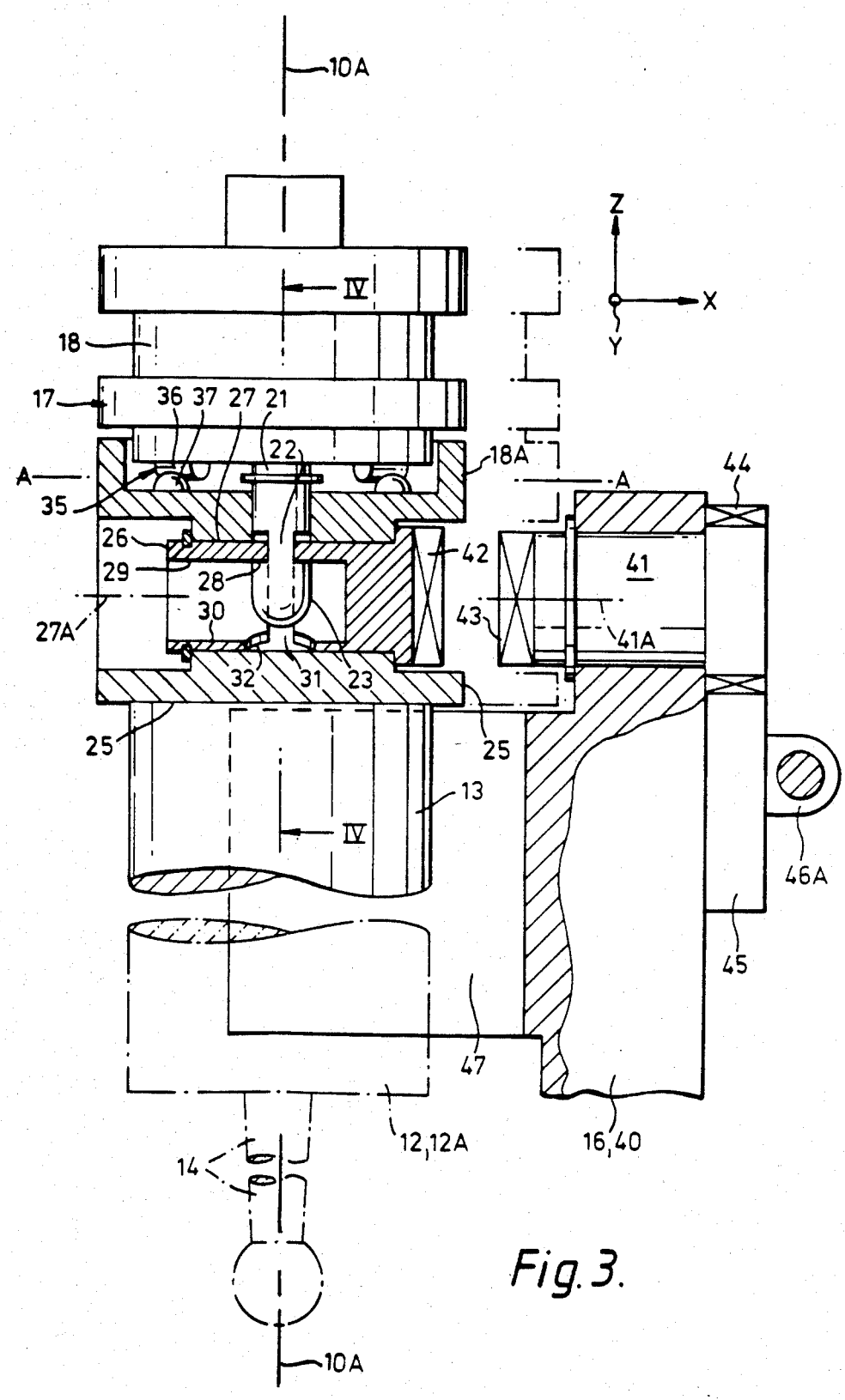
FIG. 3 is a sectional and enlarged detail of FIG. 1.
Figure 4:
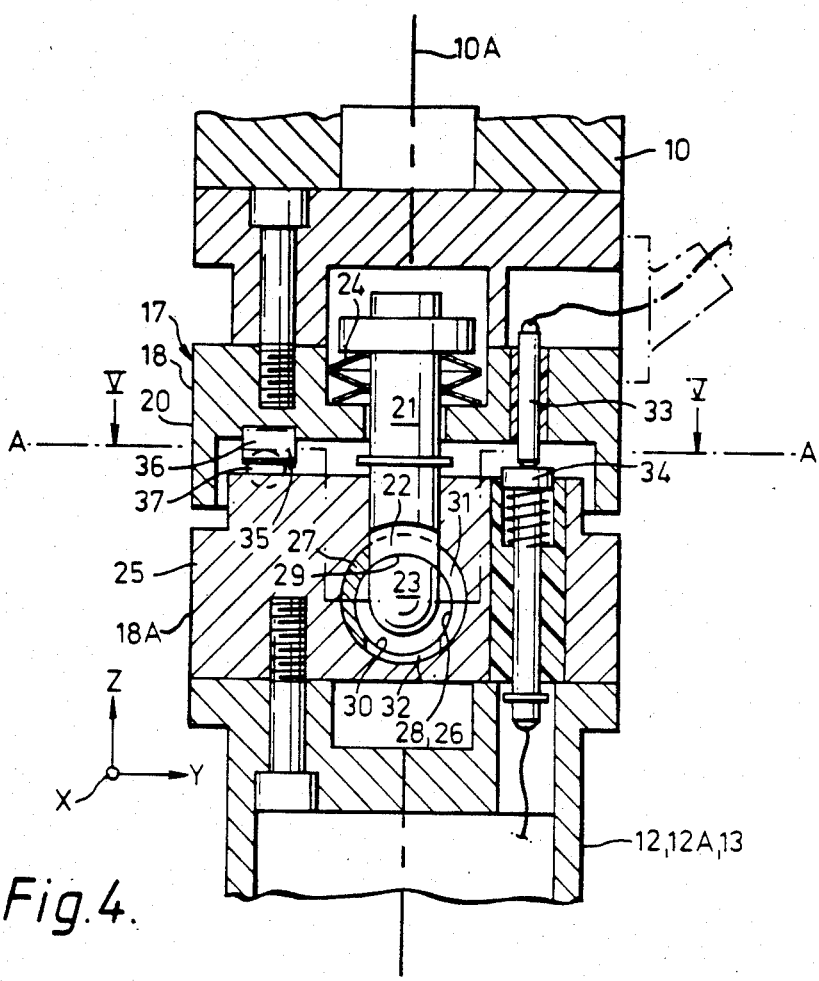
FIG. 4 is a section on the line IV—IV in FIG. 3.
Figure 5:
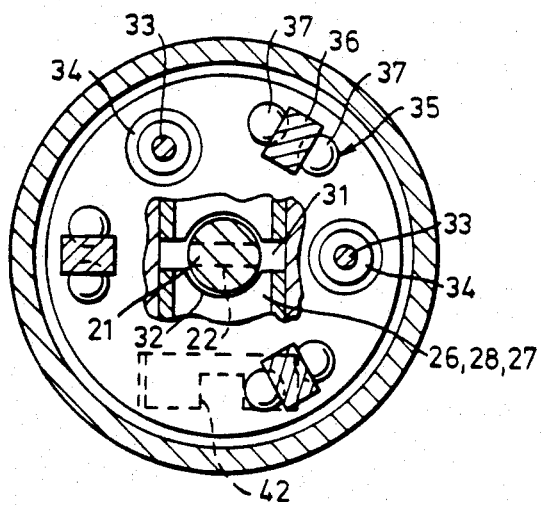
FIG. 5 is a section on the line V—V in FIG. 4.

Referring to FIGS. 3 to 5, the first coupling part 18 comprises a body 20 secured to the head of the machine and a first coupling element or locking pin 21 projecting from the body 20 in the direction Z. At its free end the pin 21 is shaped to define a neck 22 and a relatively wider head 23. A spring 24 biases the pin 21 against withdrawal from the body 20. The second coupling part 18A comprises a body 25 secured to the probe housing 13 and supporting a second coupling element or cam 26 comprising a hollow cylindrical member 27 whose axis 27A (FIG. 3) extends in the direction X. The body 25 has a bore extending transversely to the axis 10A and supporting the member 27 for rotation about an axis 27A. At its interior the member 27 defines a cam surface 28 having a high portion 29 and a low portion 30. The interior of the hollow member 27 is open to the exterior thereof by a slot 31 sufficiently wide to embrace the neck 22 of the pin 21 and engage the head 23 thereof, and at the low portion 30 of the cam surface 28 the slot 31 has widened portion 32 through which to allow the head 23 to enter the interior of the member 27 or be withdrawn therefrom.

FIGS. 3 to 5 show the coupling 17 in the engaged position, the head 23 engaging the high portion 29 of the cam surface. In this position of the coupling 17 the probe is located on the head by a kinematic support 35 (FIGS. 4, 5) defined by three cylindrical elements 36 secured to the body 20 of the first part 18 and each engaging mutually convergent surfaces of the respective pair of spherical elements 37 secured to the body 25 of the second part 18A. The elements 36, 37 respectively define first and second support surfaces lying at a plane A—A transverse to the axis 10A. The cam 26, acting through the pin 21 and the spring 24, exerts on the tool 12A a force in the direction of the axis 104 thereby to establish engagement between the elements 36,37.

The coupling 17, is disengageable by rotating the member 27 i.e. by movement of the surface 28 in the direction transversely to the axis 10A. Such rotation brings the widened portion 32 of the slot 31 into register with the head 23 so that the latter can be withdrawn from the interior of the member 27. The reverse of these actions engages the coupling 17. To operate the coupling 17 the magazine 16 comprises a frame 40 having, in respect of each probe 12 to be stored therein, an operating member 41 supported in the frame 40 for rotation about an axis 41A lying in the direction X and so positioned that a diametral slot 42 at one end of the cam member 27 can be engaged with a key 43 at the confronting end of the operating member 41. The member 41 has secured thereto a spur gear 44 engaged by a rack 45 driven by a motor 46 acting through a screw and nut gearing 46A.

To remove the tool from the head the latter is moved in the direction X to engage the slot 42 with the key 43. Thereafter the motor 46 is operated to rotate the member 27 and thereby disengage the coupling. Thereafter the head 10 is moved upwards in the direction Z to separate the parts 18,18A and thus separate the head 10 from the probe 12A. The latter is left behind on a fork 47 provided on the magazine frame 40 for the support of the probe 12A in the stored position, similar forks being provided for the probes 12B,12C. During said upward movement the pin 21 is withdrawn from the position of proximity with the cam 26 which the pin still has prior to separation of the parts 18,18A. To engage the coupling 17 the head is moved downward in the direction of the axis 10A until proximity is established between the elements 36,37. This downward movement also brings the pin 21 into the position of proximity with the cam 26, necessary for engagement of the coupling 17.

The operating members 41 and gears 44 provided for the respective probes 12A,12B,12C, and the rack 45 and motor 46, constitute said mechanism 19 for engaging or disengaging the coupling 17. More specifically, the operating members 41 are provided in or on the magazine frame 40 in the sense of being supported for operation in positions adjacent the positions occupied, or to be occupied, in the magazine by the respective probes.

To make possible transmission of said probe signal from the probe 12A to the head 10 the coupling parts 18,18A embody pairs of electrical contacts 33,34 which are engaged when the parts 18,18A are engaged. The contacts 33 of each said pair are provided on the coupling part 18 with the contact surfaces lying at the plane A—A. The contacts 34 are provided on the part 18A in positions to engage the surfaces of the contacts 33 in the direction of the axis 10A. The contacts 34 are spring-loaded as shown and are positioned to engage the contacts 33 when the tool engages the head at the elements 36,37.

The head 10 of the machine is movable by motors e.g a motor 50 (FIG. 1) to positions specified by a program 51 in a manner known per se, and the program is adapted to move the head 10 to the magazine position and is further adapted to act on the motor 46 to operate the coupling 17.

It will be clear that the invention avoids relative rotation of the head and the tool about the axis 10A such as would lead to undue relative displacement between the contacts 33,34 in the plane A—A.

In a modification, not shown, the positions of the parts 18 and 18A are reversed, the part 18 being provided on the probe housing and the part 18A being provided on the head 10. In the latter case the coupling 17 can be operated by the mechanism 19 in a manner analagous to the illustrated example or it may be operated by a motor provided in the head. However, it is an advantage of the invention that the coupling 17 can be operated by an operating mechanism provided on or in the magazine 16 because this avoids difficulties which arise for example if there is not sufficent space in or at the head for the installation of the operating mechanism.

In a further modification the member 27 is arranged to extend from the member 18 so that the slot 42 lies outside the periphery of the member 18. This makes it possible for the slot 42 to be engaged with the key 43 by axial movement of the head 10, provided of course that the slot 42 and key 43 lie in the direction of the axis 10A during such movement of the head 10. Couplings such as 17 may be provided to connect extension bars to the head 10 before similarly connecting a probe to the free end of such an extension bar. Thus the extension bar would have a coupling element at each end and it would be held in the magazine in the same way as a probe.

I claim:

1. Tool change apparatus comprising a tool;

a storage device having means for releasably supporting said tool in a stored position;

a head capable of movement relative to said storage device for removal of said tool from said stored position and return of said tool thereto, said head having a longitudinal axis and including first support means;

second support means attached to said tool and engageable with said first support means, said first and second support means co-operating during engagement thereof to support said tool on said head;

operating means for engaging the tool with the head at said support means and disengaging the tool therefrom;

a mechanical coupling distinct from said support means and including a first coupling element provided on said head;

a second coupling element provided on said tool, one of said coupling elements being supported for movement between positions of engagement with or disengagement from the other coupling element, during which movement the coupling respectively exerts or releases a force between said tool and said head in the direction of said longitudinal axis thereby causing said engagement or disengagement between said first and second support means to secure said tool to, or to allow separation of said tool from, said head, said operating means being provided on one of said head and said storage device for operating said one of said coupling elements to effect said engagement and disengagement; and an electrical coupling comprising at least one electrical contact on said head and a corresponding number of confronting electrical contacts on said tool, said confronting electrical contacts being made and broken at the same time as the engagement and disengagement between said first and second support means takes place.

2. Apparatus according to claim 1 wherein said first support means has a first support surface in a plane transverse to said longitudinal axis, and said second support means has a second support surface, said first and second support surfaces defining a kinematic support.

3. Apparatus according to claim 1 wherein one of said coupling elements is supported on one of said tool and said head through the intermediary of a spring.

4. Apparatus according to claim 1 wherein said electrical contacts comprise first electrical contacts provided on the head at a plane transverse to said longitudinal axis and second electric contacts provided on said tool, said second contacts being arranged to engage said first contacts when the tool engages the head at said support surfaces.

5. Apparatus according to claim 1, said operating means is provided on said storage device and includes an operating member, one of said coupling elements being connectable to and disconnectable from said operating member by said movement of the head for removal of the tool from and return of the tool to the storage device.

6. Apparatus according to claim 5 wherein said coupling elements are arranged so that, for the purpose of a said movement of the head for removal and return of the tool, the first coupling element is respectively withdrawn from and returned to a position of proximity with the second coupling element by movement of the head in the direction of said axis, and so that said one coupling element is connected to and disconnected from said operating member by movement of the head in one of said axial and transverse directions.

7. Apparatus according to claim 6 wherein one of said coupling elements is secured to one of said head and tool and arranged to project therefrom in the direction of said longitudinal axis, the other coupling element being supported on the other one of the head and the tool for movement transversely to said longitudinal axis and arranged by such movement to become connected to or disconnected from said one coupling element when the latter is situated at said position of proximity.

8. Apparatus according to claim 3 wherein said electrical contacts comprise comprising first electric contacts provided on the head at a plane transverse to said longitudinal axis and second electric contacts provided on said tool, said second contacts being arranged to engage said first contacts when the tool engages the head at said support surfaces.

* * * * *